United States Patent [19]

Ayers

[11] Patent Number: 5,210,843
[45] Date of Patent: May 11, 1993

[54] PSEUDO SET-ASSOCIATIVE MEMORY CACHING ARRANGEMENT

[75] Inventor: David J. Ayers, Carp, Canada

[73] Assignee: Northern Telecom Limited, Montreal, Canada

[21] Appl. No.: 902,805

[22] Filed: Jun. 24, 1992

Related U.S. Application Data

[63] Continuation of Ser. No. 174,276, Mar. 25, 1988, abandoned.

[51] Int. Cl.⁵ .................................................. G06F 12/08
[52] U.S. Cl. .............................. 395/425; 364/DIG. 1; 364/243.4; 364/243.41; 364/253; 364/254.3
[58] Field of Search ........................... 395/400, 425

[56] References Cited

U.S. PATENT DOCUMENTS

| | | | |
|---|---|---|---|
| 4,424,561 | 1/1984 | Stanley et al. | 395/425 |
| 4,437,149 | 3/1984 | Pomerene et al. | 395/425 |
| 4,441,155 | 4/1984 | Fletcher et al. | 395/400 |
| 4,453,230 | 6/1984 | Mizoguchi et al. | 395/400 |
| 4,467,414 | 8/1984 | Akigi et al. | 395/250 |
| 4,493,026 | 1/1985 | Olnowich | 395/425 |
| 4,631,660 | 12/1986 | Woffinden et al. | 395/400 |
| 4,667,288 | 5/1987 | Keeley et al. | 395/375 |
| 4,736,293 | 4/1988 | Patrick | 395/425 |
| 4,807,110 | 2/1989 | Pomerene et al. | 395/425 |

*Primary Examiner*—Michael R. Fleming
*Assistant Examiner*—Debra A. Chun
*Attorney, Agent, or Firm*—F. P. Turpin

[57] ABSTRACT

The invention provides a pseudo set-associative memory cacheing arrangement for use in a data processing system comprising a processor interfacing to a main memory and adapted to support a cache memory. The arrangement comprises a plurality of cache memory banks each comprising a respective number of addressable locations individually defined by a cache address. A plurality of cache select circuits are each associated with a respective one of the cache memory banks and each one is responsive to m most significant bits of a main memory address and control signals for mapping its associated cache memory bank to a predetermined range of addresses in main memory.

19 Claims, 6 Drawing Sheets

PSEUDO SET-ASSOCIATIVE MEMORY CACHING ARRANGEMENT

This is a continuation of application Ser. No. 174,276, filed Mar. 25, 1988, abandoned.

The invention relates generally to cache memories and more particularly to a pseudo set-associative cache memory arrangement.

BACKGROUND OF THE INVENTION

A cache memory is a relatively small fast memory which may be viewed as a buffer memory for a main or system memory and the access time to a cache memory is many times less than the access time to a main memory. The performance goal of adding a cache memory to a computer is to make the average memory access time as seen by the processor as close as possible to that of the cache memory.

The main advantage of a cache memory is that it reduces the bus traffic between a CPU (Central Processing Unit) and its system memory. In general, a cache memory contains a copy of some of the information in system memory. Although the algorithms used to read and fill memory caches vary, the common feature is that they take advantage of the temporal and/or spacial locality of the code or data accessed by the CPU. The predictability of logical memory addresses which is essential to the successful operation of a cache-main memory hierarchy is based on a common characteristic of computer programs called locality of reference. This describes the fact that over the short term, the addresses generated by a typical program tend to be confined to small regions of its logical address space.

The performance of a two-level (cache-main) memory hierarchy is frequently measured in terms of the hit ratio which is defined as the probability that a logical address generated by a CPU refers to information available from the cache memory. If the address generated by a CPU refers to information only available from main memory, that event is called a cache miss.

The contemporary VLSI processors may be divided into two sets; those that have a simple memory interface without special cache control, and those that support their own cache interface. The former group may have an external cache added to the chip boundary which can then supply the requested word in a much shorter time, if the requested address matches one that is stored in the cache. In this situation the processor does not distinguish between cache and non-cache cycles; the only difference between the two is that the cached cycle response time is much shorter.

Some processors however, support their own cache interface, and thus do distinguish between cached and non-cached accesses e.g. the R2000 CPU available from MIPS Computer Systems Inc., Sunnyvale, Calif. The CPU determines whether or not the requested address is resident in the cache (hit condition), and if not it initiates a cache miss cycle to request the information from system memory.

Common to both situations is that the address is grouped into two halves; the lower half addresses into the cache array, and the upper half is returned from the cache as data referred to as the tag. If the tag matches the requested upper address half, then the request is a hit, and the data from the cache is valid. If the tag does not match the requested upper address half, then the CPU enters a miss cycle that causes the main memory to be accessed and the retrieved information to be written in the cache memory at the originally addressed location. The simplest cache scheme allocates one tag for each word address. This type of cache is known as a direct-mapped cache memory.

Caches are very often organized into multiple sets, where all the sets are addressed simultaneously by the CPU. This has been demonstrated to be more efficient for a given amount of cache memory. In many applications the effectiveness of caches usually drops exponentially after a few Kbytes, meaning that extra memory is then better applied to allocating additional sets to increase the likelihood of hits occurring while minimizing the possibility that a needed address will be overwritten by another cached entry. This cache memory organization is referred to as a set-associative cache memory. However, since all entries must be checked simultaneously for a tag hit, this scheme is more complex than a direct-mapped arrangement. In some cases, the additional control circuitry that must be added to provide the set-associative configuration may tend to compromise the cache memory access time.

DESCRIPTION OF THE PRIOR ART

Various memory cacheing arrangements are described in numerous textbooks and patents. For example, U.S. Pat. No. 4,467,414 describes a cache memory arrangement comprising a cache buffer in combination with a pair of cache memories one for operand data and one for instructions. The patent is concerned with easing the potential conflicts that may result between read and write requests to the data cache. Pipelined processor architectures often may have a data write operation pending while a separate data read operation is requested for a different instruction simultaneously. The patent proposes the use of buffers to reduce the probability of any conflicts between instruction and operand readout requests and between storage and readout requests.

Another cacheing arrangement is described in U.S. Pat. No. 4,437,149 which is concerned with optimizing cache accesses within a split cache memory architecture conventionally referred to as the standard Harvard architecture. The cycle time of the processor is statistically decreased by using a pre-decoding circuit between the main memory and the cache so that the instructions retrieved from main memory are stored in a predecoded form in cache memory.

Yet another cacheing arrangement is described in U.S. Pat. No. 4,631,660 which relates to set-associative cache memories and the associated problems of excessive amounts of circuitry and access time to perform the associative match. The amount of circuitry is reduced by performing the associative selection prior to the validity check to effectively pipeline the cache associative compare results and the data check.

None of the above patents disclose the inventive concept of the present invention but are cited to illustrate the state of the art wherein each of the patents essentially represents some unique design architecture compromise or trade-off which is intended to improve the overall performance of the system memory and thus the processor by ultimately speeding up the operation of the memory system relative to the processor's requirements for data and instructions.

Some processors that support their own cache interface have an architecture that does not practically allow set-associativity schemes or other of the known prior art arrangements since the cache control circuitry is predefined on the processor silicon. In the aforementioned processor, for example, the cache interface circuitry defined on the chip silicon of the processor comprises a single sixteen-bit comparator for comparing a tag output from an instruction cache. Thus, such a processor is not capable of practically handling a set-associative memory cacheing arrangement. To add such a scheme using known techniques would mean avoiding the high performance CPU-cache interface that such an architecture exploits.

It is an object of this invention to provide a flexible cache memory arrangement which uses multiple cache memory banks while retaining the high speed of direct-mapped cache memories. The arrangement of the invention may be used with processors that support their own cache interface as well as with general purpose processors which do not necessarily have a dedicated cache interface. In other words, the invention provides a means of exploiting the high-performance architecture of processors having an on-chip predefined cache memory interface while also providing a priority cacheing scheme by targeting respective ones of the cache memory banks to only certain predetermined areas of main memory.

SUMMARY OF THE INVENTION

In accordance with the invention, there is provided a data processing system comprising a central processor and a hierarchical memory system comprising at least one main large memory having a relatively long access time and a pseudo set-associative instruction cache memory. The latter comprises a plurality of cache memory banks each comprising a plurality of addressable locations defined by cache addresses comprising n least significant bits of a main memory address. A plurality of cache select circuits are each associated with a respective one of the cache memory banks and are responsive to m most significant bits of a main memory address for mapping their associated cache memory bank to a respective area of main memory.

From another aspect, the invention provides a pseudo set-associative memory cacheing arrangement for use in conjunction with a processor interfacing to a main memory and adapted to support a cache memory. The arrangement comprises a plurality of cache memory banks each comprising a respective number of addressable locations individually defined by a cache address comprising n least significant bits of a main memory address. Each cache memory bank is responsive to a cache address, a read signal from the processor and a cache select signal for outputting the data at the addressed location to the data bus of the processor. The arrangement further comprises a plurality of cache select circuits each one associated with a respective one of the cache memory banks. Each cache select circuit is responsive to m most significant bits of a main memory address and predetermined control signals for asserting a cache bank select signal to its associated cache memory bank when said m most significant bits correspond to an address within a predetermined range of contiguous addresses in the main memory.

From yet another aspect, the invention provides a method of cacheing instruction data in a data processing system comprising a processor adapted to access a main memory and to support a memory cache. The memory cache is provided as a plurality of cache memory banks each comprising a respective number of addressable locations individually defined by cache addresses comprising n least significant bits of a main memory address. Each cache memory bank is mapped to a respective area of main memory.

The pseudo set-associative memory cacheing arrangement and method of the invention provides advantages not available with conventional set-associative arrangements. For example, the arrangement permits the targeting of individual cache memory banks to particular areas of main memory thus tailoring the cacheing to a particular software application. The probability of hits for any one cache memory bank thus becomes related to the compression ratio between a cache memory bank and its related area of main memory. Thus, certain address ranges can be assigned priority by allocating a smaller main memory address range to a cache memory bank; the smaller the address range, the less likely it is for data trampling to occur. The ultimate priority is obtained when a cache memory bank maps to an area of main memory that is the same size as itself.

Another advantage of the arrangement of the invention is its flexibility. It is useable with any processor whether or not it has control circuitry defined on the processor chip. In the latter case, the control signals are used in common by all the cache memory banks and the processor is not aware of the cacheing arrangement; there is no restriction on the number of memory banks or that they correspond to a multiple of two.

BRIEF DESCRIPTION OF THE DRAWINGS

An embodiment of the invention will now be described in conjunction with the drawings wherein.

DESCRIPTION OF THE PREFERRED EMBODIMENT

Figure 1A:
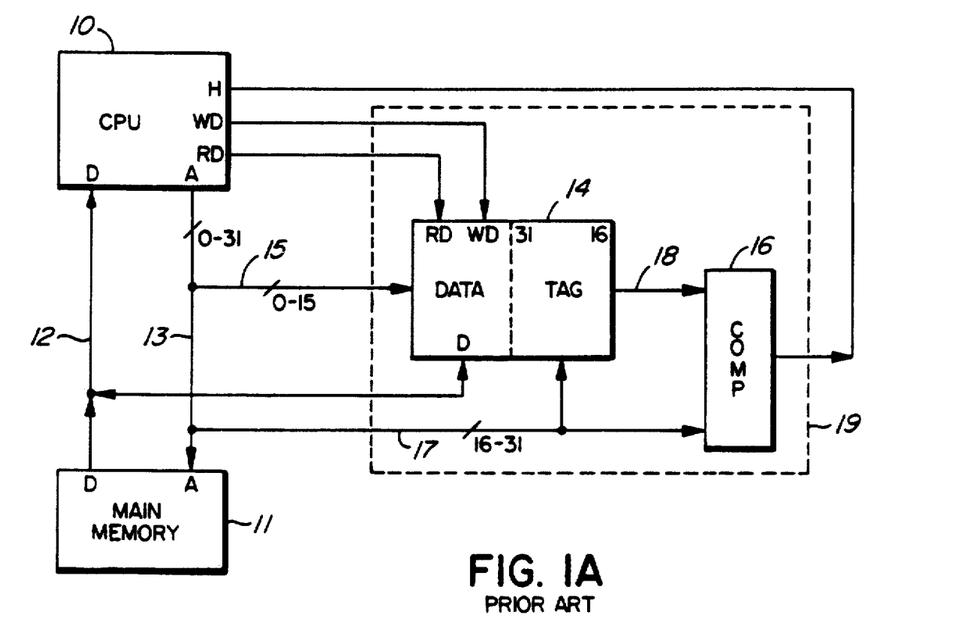
FIG. 1A is a circuit bloc diagram of a direct-mapped cache memory arrangement.

FIG. 1A shows a prior art circuit of a direct-mapped cache memory arrangement. A processor 10 is connected to a system or main memory 11 via a data bus 12 and a 32-bit address bus 13. The CPU 10 is also connected to a cache memory 14 via read (RD) and write (WD) control signals. The cache memory 14 is connected to the address bus 13 via a bus 15 carrying a predetermined number n of the least significant bits of the address on bus 13 and its data output is connected to the data bus 12. A 16-bit comparator circuit 16 has a first input connected to a bus 17 connected to the m most significant bit positions of bus 13; these m bits correspond to a tag address. The output of comparator circuit 16 is connected to the CPU 10 via a hit-miss signal lead.

Figure 1B:
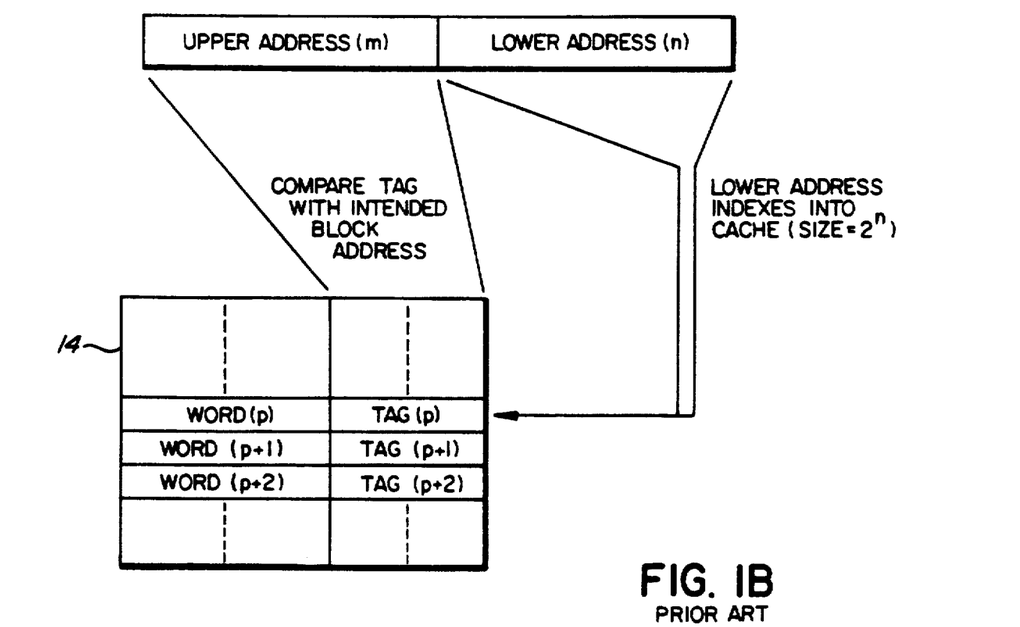
FIG. 1B is a diagram illustrating the mapping of data in the cache memory of FIG. 1.

The formatting of the cache memory 14 as well as its operation is depicted in FIG. 1B. The memory size, for example 64 kilobytes, is chosen to be compatible with the CPU 10 and maps to the entire main memory 11 which must also be formatted as x number of modules each corresponding in size to that of the cache memory 14. For example, a one gigabyte main memory 11 would be formatted as 16,384 modules of 64 kilobytes. FIG. 1B shows that the lower address of n bits is able to identify any location in cache memory 14 and the m tag bits are able to identify any module of main memory. Therefore, the cache memory 14 is mapped to the entire content of the main memory 11.

In operation, a memory address on bus 13 is split into n bits on bus 15 and m bits on bus 17. The location of memory selected by the n bit address outputs a tag comprising m bits which are compared with the m bits on bus 17 in comparator circuit 16. If the comparator output is asserted, a hit signal is sent to the CPU 10 signifying that the data at the main memory address on bus 13 is available in the cache memory. The data at the addressed cache memory location is then read out to the CPU via data bus 12. If the comparator output is not asserted, the CPU 10 interprets the event as a miss situation indicating that the data at the main memory address on bus 13 is not stored in the cache memory. The CPU 10 then initiates a miss cycle which includes addressing the main memory 11 at the address on bus 13, reading the addressed location information on bus 12 and causing it to be written in the cache memory 14 at the location corresponding to the n-bits on the address bus together with the tag information corresponding to the m-bits of the address on bus 13.

Figure 1C:
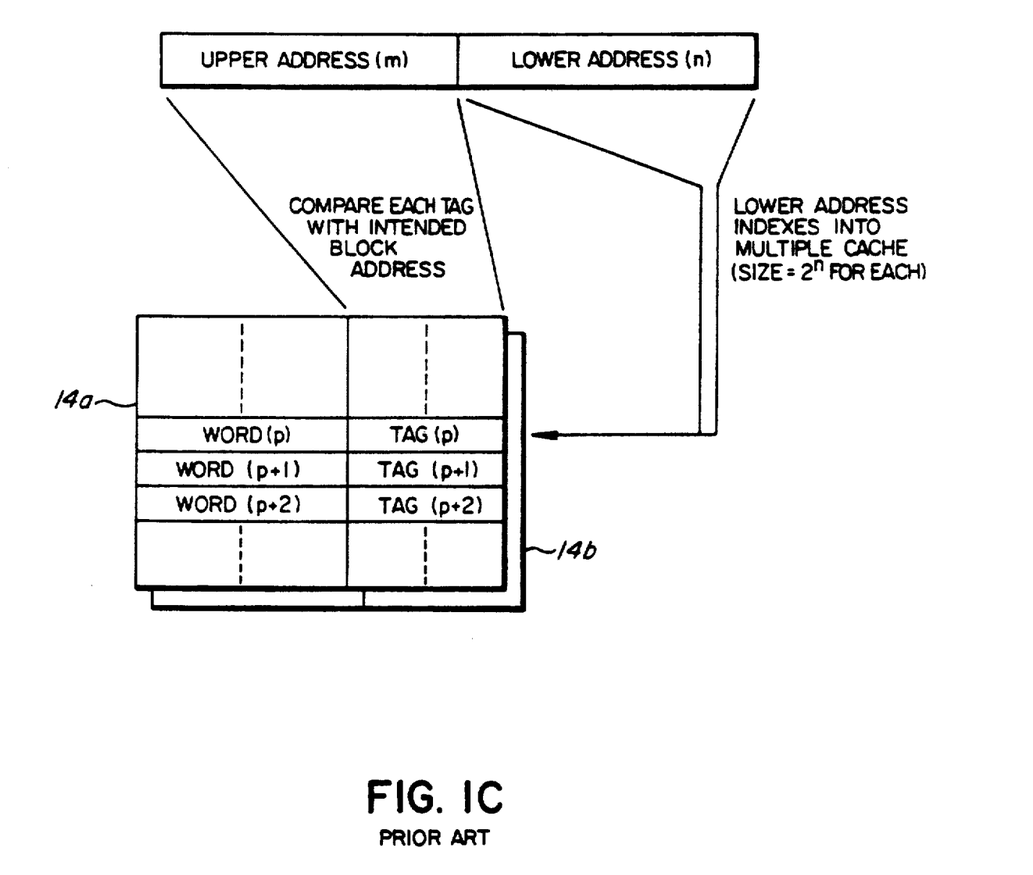
FIG. 1C is a diagram illustrating the mapping of data in a set-associative cache memory arrangement.

FIG. 1C illustrates the data formatting for a pair of cache memories 14a and 14b. The circuit diagram for this prior art set-associative memory arrangement is not shown since it is very similar to that shown in FIG. 1A. The circuitry inside the rectangle 19 is simply duplicated for each memory bank and the comparator circuitry is expanded with combinatorial logic to provide a single output to the H input of the CPU 10.

In this type of cacheing arrangement, each memory bank is mapped to the entire content of the main memory. Thus since all entries of the memory banks must be checked simultaneously for a tag hit, this arrangement is more complex than the direct-mapped scheme described above. Because additional control circuitry must be added, the cache access time is increased and, in some cases, may be compromised. In addition, it is highly impractical to allow set-associativity with VLSI (very large scale integration) CPUs which have cache control circuitry predefined on the silicon chip of the processor because to do so would mean to forego the high performance CPU-cache memory interface that such a CPU exploits.

Figure 2:
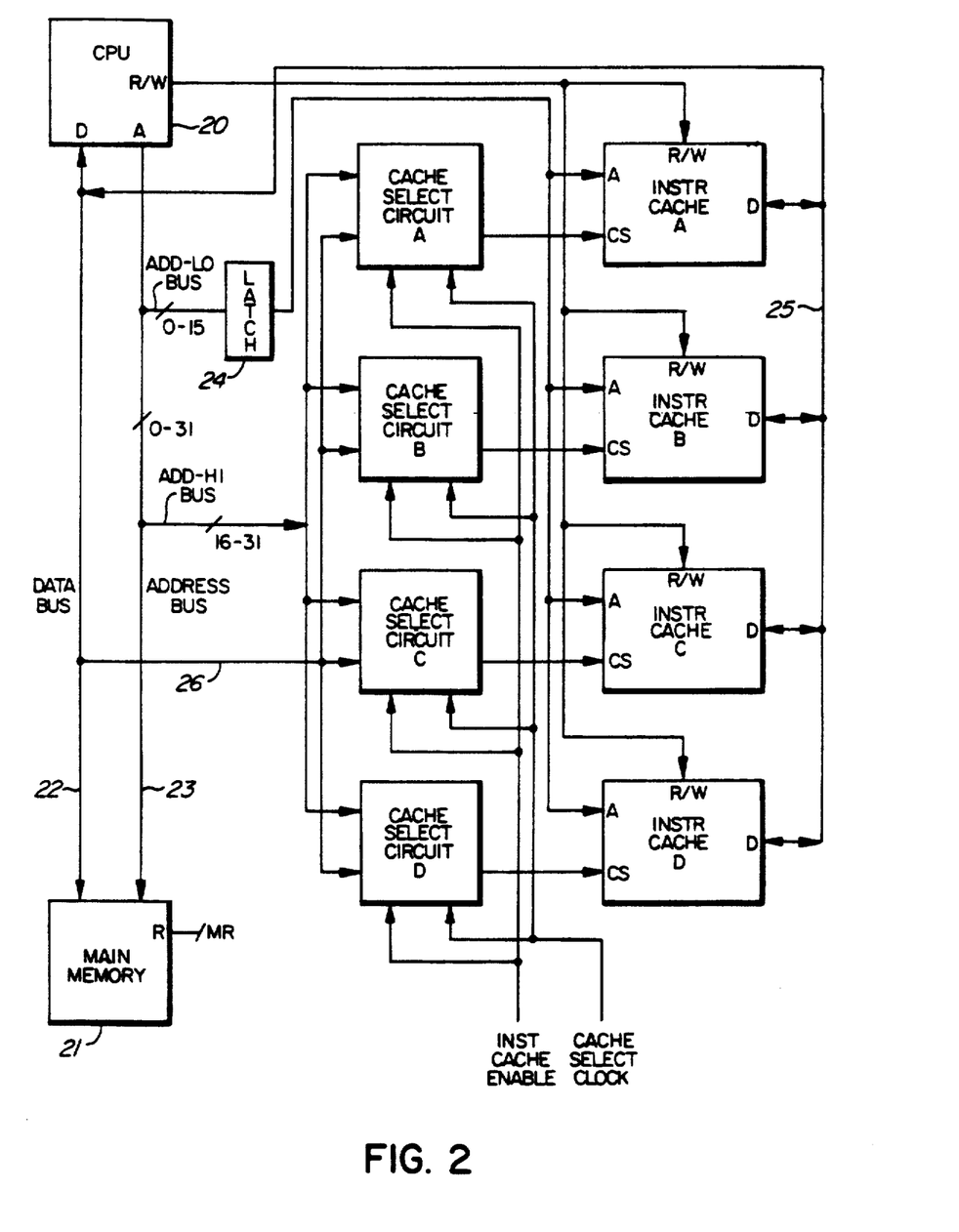
FIG. 2 is a circuit bloc diagram of a pseudo set-associative cache memory arrangement in accordance with the invention.

FIG. 2 shows a pseudo set-associativity cacheing arrangement which may be used in conjunction with any type of processor. A VLSI CPU 20 is connected to a main memory 21 via a data bus 22 and an address bus 23. A cache memory having four banks A, B, C, D of memory each comprising sixty-four kilobytes of instruction and tag data. Each bank has a read/write (R/W) input from the CPU 20, a cache select input, and an address input from a latch circuit 24 having its input connected to the address bus 23 via an ADD-LO bus for carrying n of the least significant bits from the address bus 23. The memory banks have their output connected to the CPU 20 via a bus 25 and data bus 22.

Each of a plurality of cache select circuits A, B, C, D is associated with a respective one of the cache memory banks A, B, C, D. Each cache select circuit has a first input connected to the address bus 23 via an ADD-HI bus for carrying m of the most significant bits from the address bus 23 and a second input connected to data bus 22 via a bus 26. Each cache select circuit also has a pair of input control signals—an instruction cache enable signal and a cache select clock signal. The output of each cache select circuit is connected to a respective cache select input of memory banks A, B, C, D.

The VLSI processor 20 has control circuitry defined on the same chip and this includes a comparator circuit much as that shown in FIG. 1A. If an ordinary processor was used in the circuit of FIG. 2, such a comparator circuit would require to be inserted in the bus 25 from the memory banks A, B, C, D to the CPU 20.

It may be noted that many CPUs often provide a second interface to a data cache memory. However, because of the dynamic nature of data memory operations whereby a write data cycle may occur at any instant, the cacheing arrangement of the invention, which allows writing to memory only on a miss cycle, is not suitable for use as a data cache memory unless the write data cycle to an unselected data cache is always preceded by a miss cycle which then causes the appropriate data cache to be selected.

Figure 3:
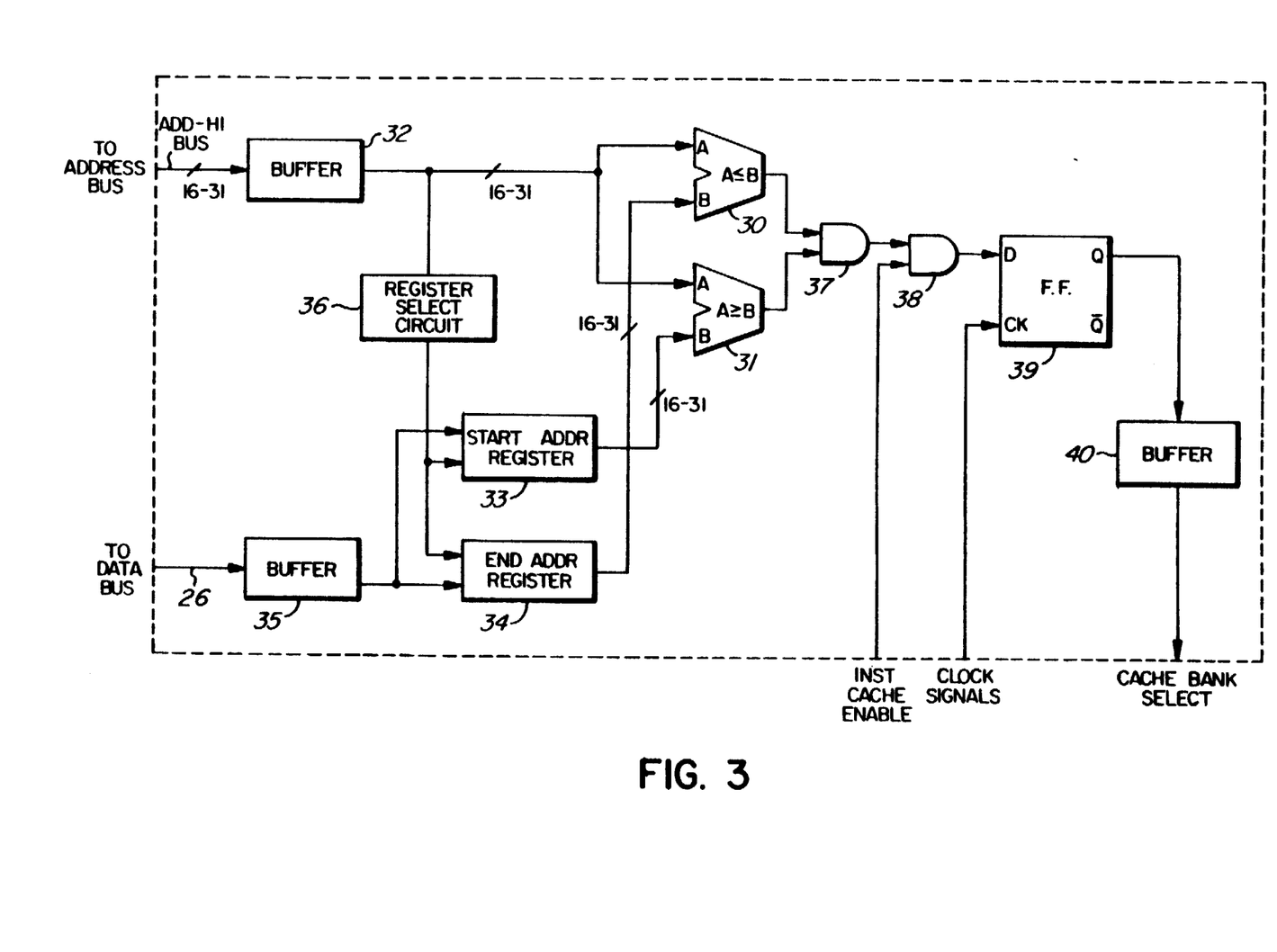
FIG. 3 is a logic circuit diagram of a cache select circuit shown in FIG. 2.

FIG. 3 is a logic circuit diagram of one of cache select circuits A, B, C, D of FIG. 2. Each of comparator circuits 30 and 31 has a first input connected to the ADD-HI bus through a buffer 32 and a second input connected to respective outputs of registers 33 and 34. Register 33 is adapted to store m bits corresponding to the most significant bits of a start address of an address range of the main memory 21 whereas register 34 is adapted to store m bits corresponding to the most significant bits of a stop address of the same address range of the main memory 21. Each of registers 33 and 34 has a first input connected to data bus 26 through a buffer 35 and a second input connected to the ADD-HI bus through a register select circuit 36 and the buffer 32. The content of registers 33 and 34 may then be selectively altered by causing the register select circuit to enable one or the other and feeding in data into the selected register from the data bus 26.

The outputs of comparator circuits 30 and 31 are connected to respective inputs of AND gate 37 whose output level represents the function that an address appearing on the ADD-HI bus is less than or equal to the end address in register 34 and is greater than or equal to the start address in register 33. The output of gate 37 is ANDED with an instruction cache enable signal in gate 38 whose output is connected to the D-input of a flip-flop 39 having its clock input connected to a source of clock signals. The Q output of the flip-flop 39 is connected to the cache select input of its associated cache memory bank through a buffer gate 40. All of the components necessary to the realization of the circuit of the invention are available as off-the-shelf components from various semiconductor manufacturers.

Figure 4:
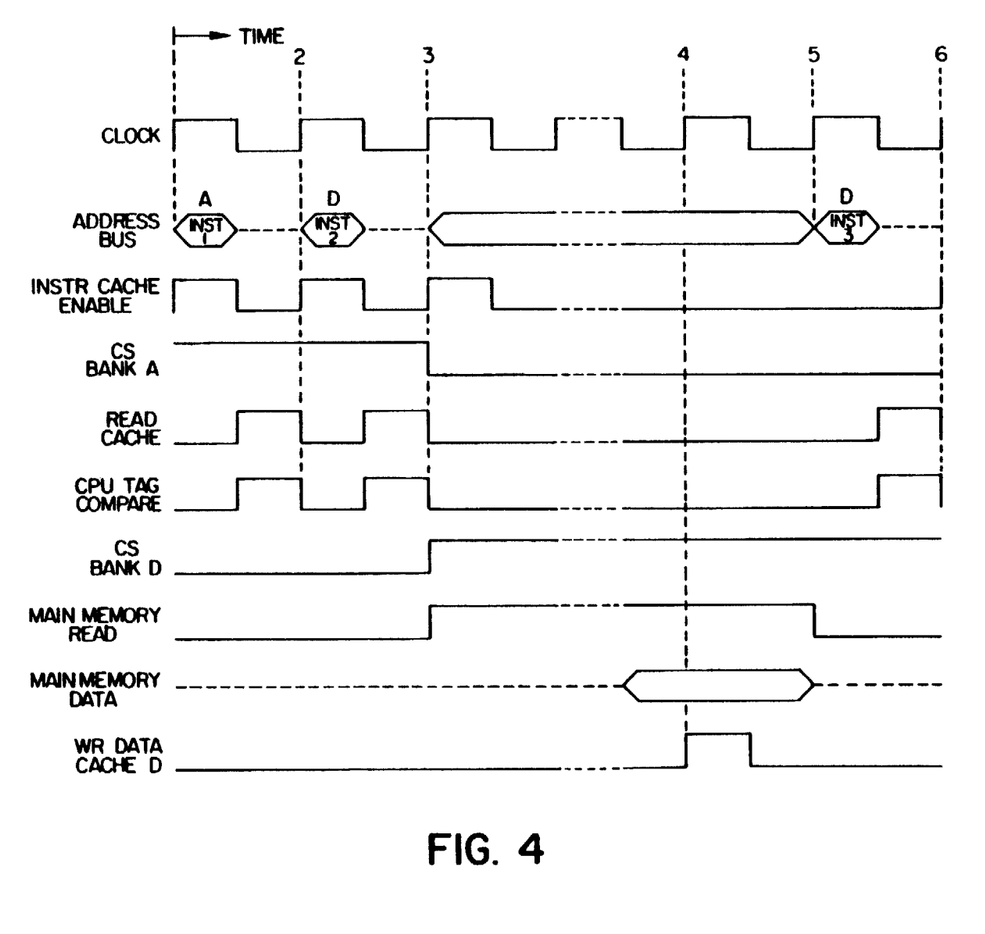
FIG. 4 is a waveform diagram illustrating the operation of the circuit of FIG. 2.

The operation of the circuit will be described in conjunction with FIGS. 2, 3, and 4 which is a waveform diagram illustrating the level at various points in the circuit. It should be understood that the relative timing indicated by the waveforms is purely illustrative of the operation of the circuit and would vary depending on the type of CPU, clock frequency and other factors.

At point 1 in time it is assumed that the cache select circuits A, B, C, D have all had their range registers loaded with data and that the CPU 20 is progressing through a set of instructions which last caused the instruction cache A to be accessed (CS-A asserted). At this point, the CPU issues an instruction request by putting on the ADD-LO bus an address (INST-1) that is within the range of addresses of the instruction cache A. Since the CS signal for cache A is already asserted, the read cache signal from the CPU causes the data from cache A at the location defined by the bits on the ADD-LO address bus to be read out on bus 25. The data contained at any one location may vary depending on the exact embodiment. In the example embodiment, a cache location data word comprises 32 data bits, 16 tag bits, 7 parity bits and 1 valid bit. The tag portion of that data is compared in the processor interface comparator with the m bits on the address bus. At point 2 in time, the CPU has determined that a hit condition exists and issues a new address (INST-2) on bus 23, this address corresponding to one within the range of select circuit D. Since CS-A was previously asserted and CS-D is not yet asserted, the data read out at the location represented by the address on the ADD-LO bus results in the CPU declaring a miss at point 3 in time, and a miss cycle being initiated. This results in the main memory 21 being accessed at the location defined by the address on bus 23. During that time, the data on the ADD-HI bus results in the cache select D output signal being asserted. When the data at the addressed location of main memory 21 becomes available on data bus 22, it is received by the CPU 20 and is written into cache bank D (point 4) at the address appearing on the ADD-LO bus.

At point 5 in time, the CPU issues a new memory access request (INST-3) which is an address within the range of memory bank D. Since CS-D is already asserted, the data in cache D at the location defined by the ADD-LO address is read out and its tag is compared in the CPU to the m bits on the address bus. At point 6 in time, a new instruction request is issued if a match exists and if not, a miss cycle is initiated. As illustrated in FIG. 4 a cache access cycle is very much faster than a main memory access cycle; a ratio of ten to one is not uncommon.

Figure 5:
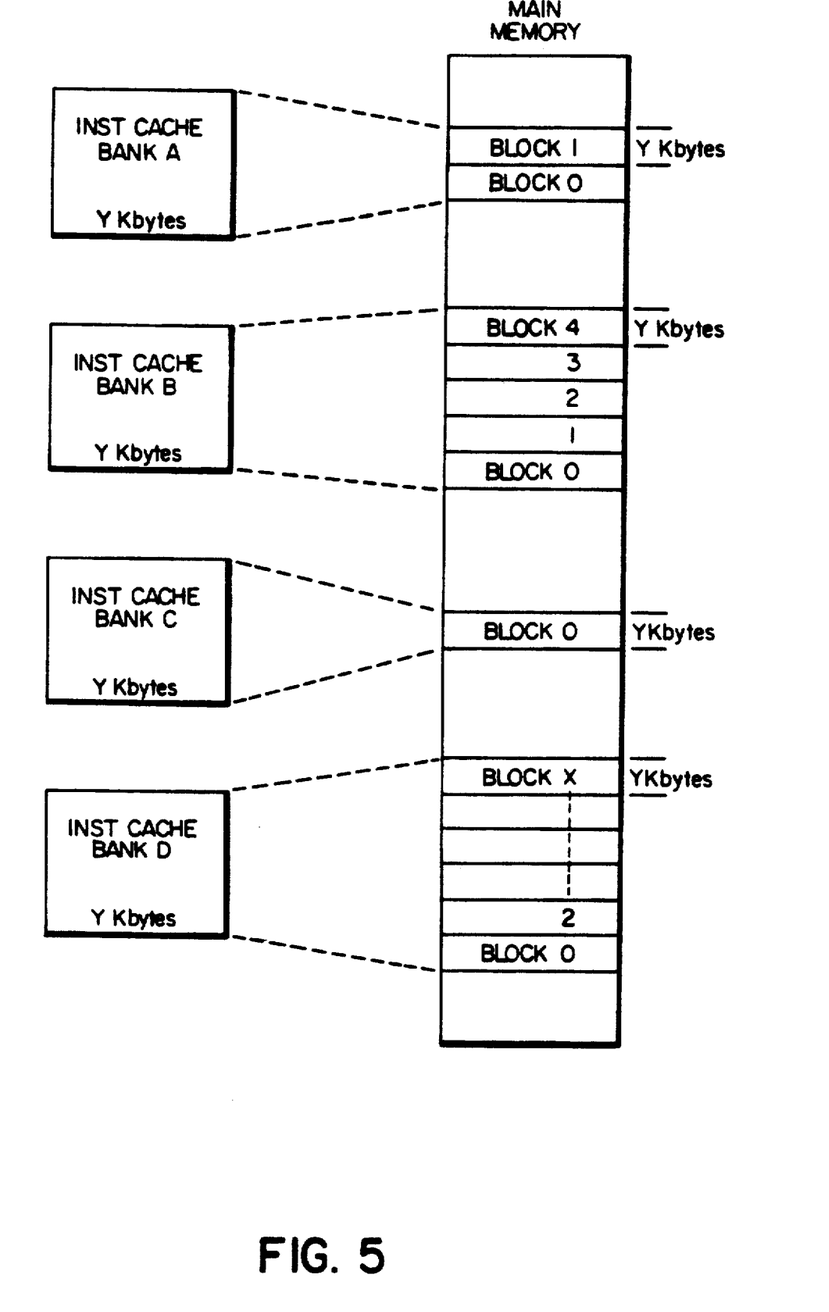
FIG. 5 is a diagram illustrating the cache data mapping of the cacheing arrangement of the invention.

FIG. 5 illustrates the flexibility of mapping to main memory that the cacheing arrangement of the invention provides. Each memory cache bank is defined by a range of addresses as controlled by its associated cache select circuit. Thus, each cache bank may map to a predetermined area of main memory. This therefore provides a priority of allocation which permits the cacheing memory to become more responsive to predetermined areas of main memory. The smaller the address range allocated to a cache memory bank corresponds to a decreased likelihood of data trampling. The ultimate priority is obtained when the cache memory bank maps to an area of main memory the same size as itself.

It may be noted that the cacheing arrangement described above makes use of the CPU interface control signals in such a way that the CPU is basically required to manage only one cache memory regardless of the number of memory cache banks that there is in the cacheing arrangement.

The invention therefore provides a memory cacheing scheme which is completely flexible in that it may be used in conjunction with a variety of processors whether or not they have an interface defined on the processor chip. It also provides the flexibility of having any number of cache memory banks each one mapped to a predetermined area of main memory. Furthermore, the mapped areas may be changed at will by simply reprogramming the range registers in the cache select circuits. If desired, some of the mapped areas can be set to overlap at least partly.

The above description of the invention was presented for purposes of illustration. Many variations and modifications are possible in view of the above teaching without departing from the scope and spirit of the invention.

What is claimed is:

1. A data processing system comprising a central processor and a hierarchical memory system comprising at least one main large memory having a relatively long access time and a pseudo set-associative cache memory comprising a plurality of cache memory banks each comprising a plurality of addressable locations defined by cache addresses comprising n least significant bits of a main memory address, a plurality of cache select circuits each one associated with a respective one of the cache memory banks and each one being responsive to m most significant bits of a main memory address and predetermined control signals for asserting an enable signal to its respective cache memory bank when said m most significant bits correspond to an address within a predetermined respective range of contiguous addresses in main memory.

2. A data processing system as defined in claim 1 wherein each cache select circuit comprises means for storing an asserted enable signal.

3. A data processing system as defined in claim 2 wherein an enable signal remains asserted until it becomes unasserted in a subsequent memory cycle.

4. A data processing system as defined in claim 3 wherein a newly asserted enable signal is generated only during a miss cache memory cycle.

5. A data processing system as defined in claim 4 wherein the memory address ranges defined by the various cache select circuits map to mutually exclusive areas of main memory.

6. A data processing system as defined in claim 5 wherein each cache select circuit further comprises a first register for storing m bits corresponding to the start address of a memory range, a second register for storing m bits corresponding to the end address of the memory range, comparator means for providing an output signal during a memory addressing cycle of the processor if the m bits of the memory address from the processor correspond to an address which is less than or equal to the end address stored in the second register and is greater or equal to the start address stored in the first register and gating means for storing said output signal into the storage means under control of predetermined signals.

7. A data processing system as defined in claim 6 wherein the storage means for storing an asserted cache select signal is a flip-flop.

8. A data processing system as defined in claim 7 wherein each cache select circuit still further comprises, circuit means for loading said start and end addresses in the first and second registers under control of the processor.

9. A pseudo set-associative memory cacheing arrangement for use in conjunction with a processor interfacing to a main memory and adapted to support a cache memory, the arrangement comprising a plurality of cache memory banks each comprising a respective number of addressable locations defined by cache addresses comprising n least significant bits of a main memory address and each being responsive to a cache address, a read signal from the processor and a cache select signal for outputting the data at the addressed location to the data bus of the processor, a plurality of cache select circuits each one associated with a respective one of the cache memory banks and each one being responsive to m most significant bits of a main memory address and predetermined control signals for asserting a cache bank select signal to its associated cache memory bank when said m most significant bits correspond to an address within a predetermined respective main memory range of contiguous addresses.

10. A pseudo set-associative memory cacheing arrangement as defined in claim 9 wherein each select circuit comprises storage means for storing an asserted cache select signal until it becomes unasserted during a subsequent memory cycle.

11. A pseudo set-associative memory cacheing arrangement as defined in claim 10 wherein a newly asserted enable signal is generated only during a miss cache memory cycle.

12. A pseudo set-associative memory cacheing arrangement as defined in claim 11 wherein each cache select circuit maps unto a respective range of memory locations of main memory.

13. A pseudo set-associative memory cacheing arrangement as defined in claim 12 wherein the memory address ranges defined by the various cache select circuits are non-overlapping.

14. A pseudo set-associative memory cacheing arrangement as defined in claim 13 wherein each cache select circuit further comprises a first register for storing m bits corresponding to the start address of a memory range, a second register for storing m bits corresponding to the end address of the memory range, comparator means for providing an output signal during a memory addressing cycle of the processor if the m bits of the memory address from the processor correspond to an address which is less than or equal to the end address stored in the second register and is greater or equal to the start address stored in the first register and gating means for storing said output signal into the storage means under control of predetermined signals.

15. A pseudo set-associative memory cacheing arrangement as defined in claim 14 wherein the storage means for storing an asserted cache select signal is a flip-flop.

16. A pseudo set-associative memory cacheing arrangement as defined in claim 15 wherein each cache select circuit still further comprises, circuit means for loading said start and end addresses in the first and second registers under control of the processor.

17. A method of cacheing instruction data in a data processing system including a processor interfacing to a main memory and adapted to support a cache memory comprising a plurality of cache memory banks each comprising a plurality of addressable locations defined by cache addresses comprising n least significant bits of a main memory address, the method comprising the step of allocating a respective range of contiguous main memory addresses to each of the cache memory banks thereby mapping each memory bank to a respective portion of main memory.

18. A method of cacheing instructions in a data processing system as defined in claim 17 wherein the cache memory further comprises a plurality of cache select circuits each one associated with a respective one of the cache memory banks and each one being responsive to m most significant bits of a main memory address and predetermined control signals for asserting an enable signal to its respective cache memory bank when said m most significant bits correspond to an address within a predetermined main memory range of contiguous addresses, the method comprising the further step of storing an asserted enable signal from a cache select circuit to its associated cache memory bank until it becomes unasserted during a subsequent memory cycle.

19. A method of cacheing instruction data in a data processing system as defined in claim 18 and comprising the further step of generating a newly asserted enable signal only during a miss cache memory cycle.

* * * * *